(12) United States Patent
Kurihara (10) Patent No.: US 11,787,291 B2
(45) Date of Patent: Oct. 17, 2023

(54) OPERATION DEVICE AND WORK VEHICLE (71) Applicant: Komatsu Ltd., Tokyo (JP)

(72) Inventor: Kota Kurihara, Tokyo (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 17/634,326

(22) PCT Filed: Sep. 3, 2020

(86) PCT No.: PCT/JP2020/033376
§ 371 (c)(1),
(2) Date: Feb. 10, 2022

(87) PCT Pub. No.: WO2021/049402
PCT Pub. Date: Mar. 18, 2021

(65) Prior Publication Data
US 2022/0281320 A1 Sep. 8, 2022

(30) Foreign Application Priority Data

Sep. 10, 2019 (JP) .................. 2019-164244

(51) Int. Cl.
B60K 37/06 (2006.01)
B60K 20/08 (2006.01)
B62D 1/04 (2006.01)

(52) U.S. Cl.
CPC .............. *B60K 37/06* (2013.01); *B60K 20/08* (2013.01); *B62D 1/04* (2013.01)

(58) Field of Classification Search
CPC ........ B60K 37/06; B60K 20/08; B60K 26/00; B62D 1/04
See application file for complete search history.

(56) References Cited

U.S. PATENT DOCUMENTS

| 2,141,936 | A | * | 12/1938 | Schmitt | H01H 23/14 D8/353 |
| 2,824,915 | A | * | 2/1958 | Buturuga | H01H 23/14 200/43.16 |
| 6,039,141 | A | * | 3/2000 | Denny | B60N 2/14 296/190.01 |
| 9,086,130 | B1 | * | 7/2015 | Anderson | F16H 59/0217 |
| 2014/0191558 | A1 | * | 7/2014 | Riedel, Jr. | B60K 37/06 180/336 |

FOREIGN PATENT DOCUMENTS

| EP | 2916339 A1 * | 9/2015 | ............. H01H 23/04 |
| JP | 2003-535746 A | 12/2003 | |
| JP | 2017-100523 A | 6/2017 | |
| JP | 2017-109605 A | 6/2017 | |
| WO | 01/94147 A1 | 12/2001 | |

* cited by examiner

*Primary Examiner* — Thomas C Diaz
(74) *Attorney, Agent, or Firm* — Locke Lord LLP (57) ABSTRACT An operation device is an operation device of a work vehicle having a load-carrying platform, which includes a gearshift instruction part configured to change a speed of the work vehicle by being operated in a forward/rearward direction, an elevating/lowering instruction part disposed in front of the gearshift instruction part and configured to operate elevation of the load-carrying platform, and a partitioning part configured to partition a space between the gearshift instruction part and the elevating/lowering instruction part in the forward/rearward direction.

12 Claims, 6 Drawing Sheets

OPERATION DEVICE AND WORK VEHICLE

TECHNICAL FIELD

The present invention relates to an operation device and a work vehicle.

Priority is claimed on Japanese Patent Application No. 2019-164244, filed Sep. 10, 2019, the content of which is incorporated herein by reference.

BACKGROUND ART

As a work vehicle, a transportation vehicle that operates at a stone-crushing site, a civil engineering site, a mine, or the like, is known. An operator of the transportation vehicle performs a steering wheel operation, a shift lever operation, a dump lever (hoist lever) operation, an accelerator/brake operation, and the like, in a loading station or a dump site.

The transportation vehicle includes a load-carrying platform, which is able to elevate, referred to as a body. A load such as earth can be loaded on the load-carrying platform. For an operation device of the transportation vehicle, a configuration including a gearshift instruction part configured to change a speed of the transportation vehicle by being manipulated in a forward/rearward direction and an elevating/lowering instruction part disposed in front of the gearshift instruction part and configured to operate elevation of the load-carrying platform is known as an example.

For example, the following Patent Document 1 discloses a configuration of having an operation lever that is pivotable (movable in an arc shape) around a rotation axis extending in a widthwise direction (a direction perpendicular to the forward/rearward direction), a knob main body coupled to an upper end portion of the operation lever, and a movable switch disposed in front of the knob main body. The movable switch is moved integrally with the knob main body (moved in an arc shape) according to the arc-shaped movement of the operation lever. A space that allows communication between the side of the knob main body and the side of the movable switch is provided between the knob main body and the movable switch in the forward/rearward direction.

RELATED ART DOCUMENT

Patent Document

[Patent Document 1]
U.S. Pat. No. 9,086,130

SUMMARY

Problems to be Solved by the Invention

An operator of a work vehicle moves a work vehicle to a predetermined place to perform a work of dumping a load of a load-carrying platform (dump work). For example, when the dump work is performed, movement of the operator's hand is the following procedure from (1) to (3).

(1) Moving the vehicle to a dump place while holding a steering wheel with the hands and operating the steering wheel.

(2) Operating a shift lever (a gearshift instruction part) when the vehicle stops at the dump place.

(3) Operating a hoist lever (an elevating/lowering instruction part) to hoist-operate the load-carrying platform after the vehicle stops.

For example, only the gearshift instruction part may be operated without operating the elevating/lowering instruction part. In this case, when a space that brings the side of the gearshift instruction part in communication with the side of the elevating/lowering instruction part is provided, the hands or fingers may inadvertently touch the elevating/lowering instruction part to cause the load-carrying platform to malfunction.

Here, the present invention is directed to providing an operation device and a work vehicle that are capable of minimizing wrong operations of an elevating/lowering instruction part.

Means for Solving the Problem

An operation device according to an aspect of the present invention is an operation device of a work vehicle having a load-carrying platform, which includes a gearshift instruction part configured to change a speed of the work vehicle by being operated in a forward/rearward direction, an elevating/lowering instruction part disposed in front of the gearshift instruction part and configured to operate elevation of the load-carrying platform, and a partitioning part configured to partition a space between the gearshift instruction part and the elevating/lowering instruction part in the forward/rearward direction.

Advantage of the Invention

According to the aspect, it is possible to minimize wrong operations of an elevating/lowering instruction part.

DESCRIPTION OF THE EMBODIMENTS

Hereinafter, an embodiment of the present invention will be described with reference to the accompanying drawings. In the embodiment, an articulated dump truck will be exemplarily described as an example of a work vehicle.

<Work Vehicle>

Figure 1:
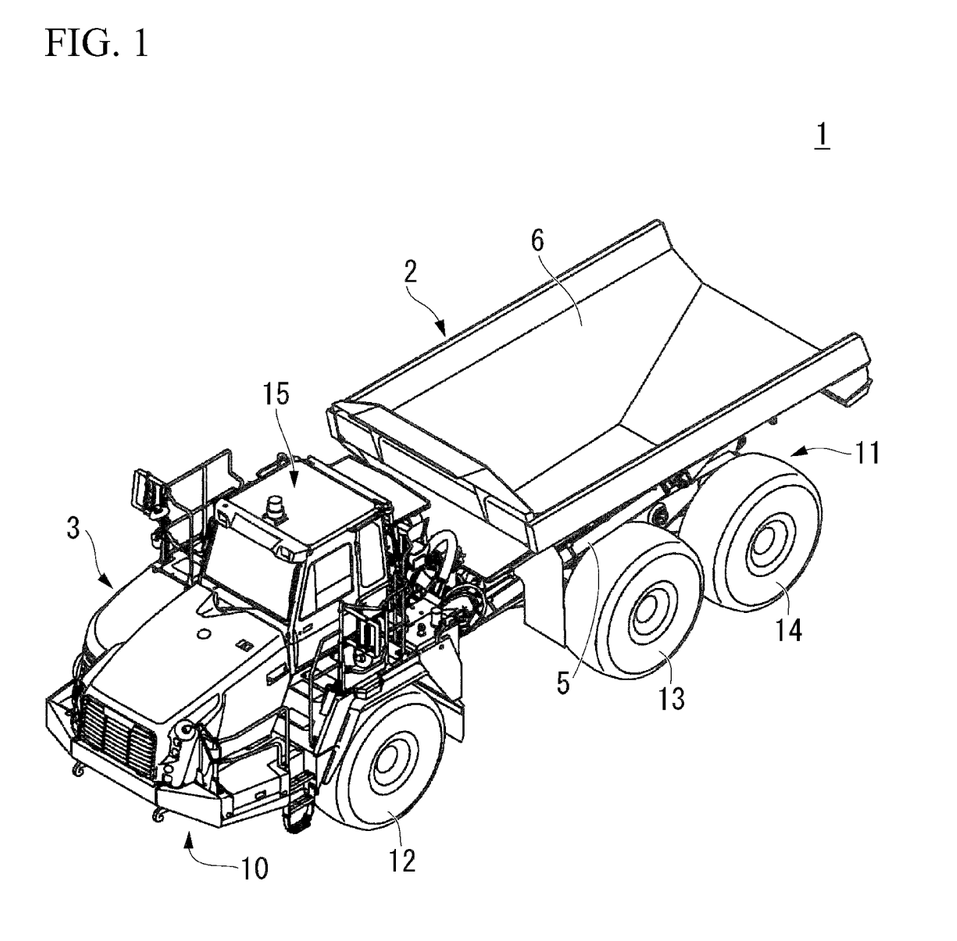
FIG. 1 is a perspective view of a work vehicle according to an embodiment.

As shown in FIG. 1, a dump truck 1 serving as a work vehicle includes a vehicle rear portion 2 and a vehicle front portion 3. Hereinafter, a forward direction, a rearward direction and a vehicle width direction of the dump truck 1 are referred to as "toward a side in front of the vehicle (one side in the vehicle forward/rearward direction)," "toward a side behind the vehicle (the other side in the vehicle forward/rearward direction) and "a vehicle width direction." The vehicle width direction may be referred to as a "toward a left side (one side in the vehicle width direction)" or "toward a right side (the other side in the vehicle width direction)." A right hand with respect to a direction in which the dump truck 1 advances is referred to as a right side, and a left hand with respect to the direction in which the dump truck 1 advances is referred to as a left side. An upward/downward direction, and above and below in a state in which the dump truck 1 is disposed on a horizontal plane are simply referred to as "a vertical direction," and "above" and "below."

<Vehicle Rear Portion>

The vehicle rear portion 2 includes a rear frame section 11, rear front-wheels 13 and rear rear-wheels 14. The rear frame section 11 constitutes a frame of the vehicle rear portion 2. The vehicle rear portion 2 is provided behind the vehicle front portion 3 of the vehicle. The vehicle rear portion 2 includes a hoist cylinder 5 and a load-carrying platform 6. One end of the hoist cylinder 5 is pivotably connected to the rear frame section 11 of the vehicle rear portion 2 via a bracket (not shown). The load-carrying platform 6 is connected to the other end of the hoist cylinder 5 via a bracket (not shown). The load-carrying platform 6 is driven by the hoist cylinder 5. The hoist cylinder 5 is driven by a hydraulic pressure supplied via a hydraulic circuit (not shown).

<Vehicle Front Portion>

The vehicle front portion 3 includes a front frame section 10, front wheels 12 and a cab 15.

The front frame section 10 constitutes a frame of the vehicle front portion 3. The rear frame section 11 is connected to a side behind the front frame section 10 of the vehicle by a connecting member (not shown). The front frame section 10 and the rear frame section 11 are made pivotable with respect to each other in the horizontal direction by connecting them around an axis extending in the upward/downward direction. When the front frame section 10 and the rear frame section 11 advance or reverse while being pivoted relatively, the vehicle front portion 3 of the dump truck 1 swings rightward or leftward (right swing or left swing). Further, the front frame section 10 and the rear frame section 11 are pivotable independently from each other around the axis extending in the forward/rearward direction via the connecting member (not shown).

The pair of front wheels 12 are provided on the front frame section 10 separately in the vehicle width direction. The pair of rear front-wheels 13 are provided on a front portion of the rear frame section 11 separately in the vehicle width direction. The pair of rear rear-wheels 14 are provided on a rear portion of the rear frame section 11 separately in the vehicle width direction. When the front wheels 12, the rear front-wheels 13 and the rear rear-wheels 14 are driven, the dump truck 1 advances and retreats.

<Cab>

Figure 2:
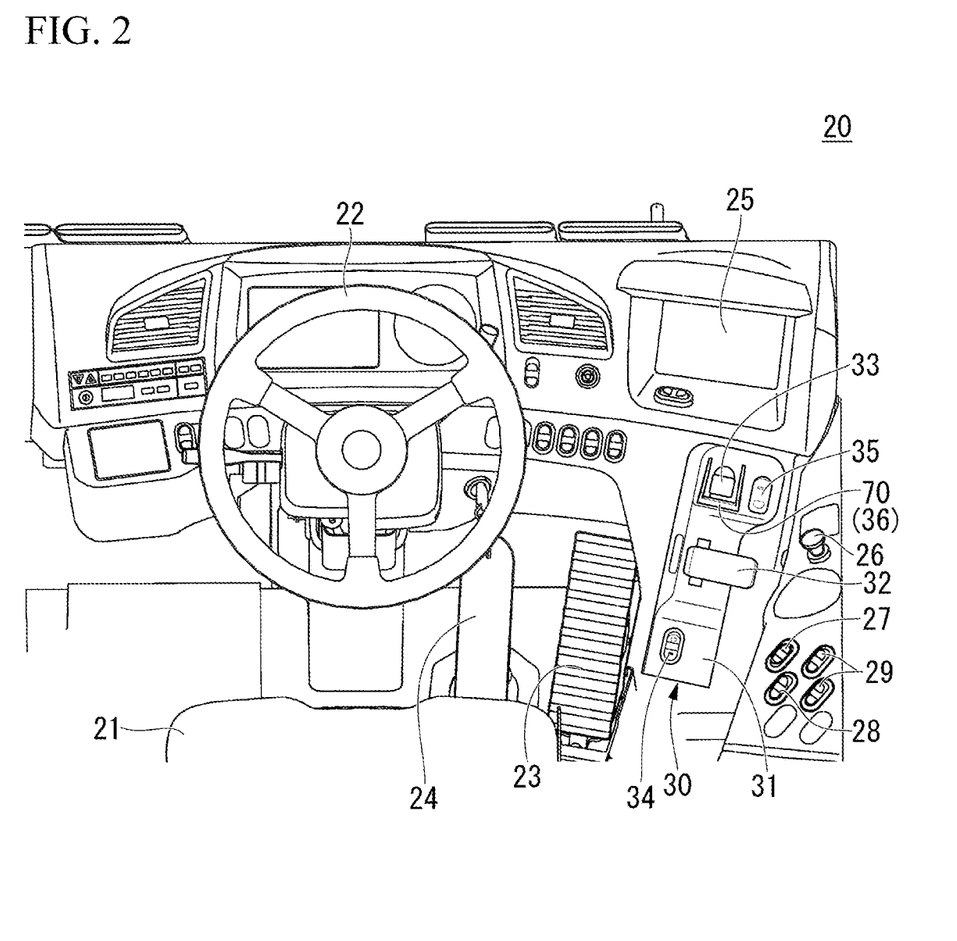
FIG. 2 is a view showing the inside of a cab of the work vehicle according to the embodiment when seen from behind and above the vehicle.

The cab 15 is provided on a rear portion and an upper portion of the front frame section 10. The inside of the cab 15 is shown as a cab 20 (see FIG. 2) for an operator. As shown in FIG. 2, a driver's seat 21, a steering wheel 22, an accelerator pedal 23, a brake pedal 24, a back monitor 25 and an operation device 30 are provided in the cab 20.

A cigarette lighter 26, a power window switch 27 and a side lamp switch 28 are disposed in the cab 20 on the right side of the operation device 30. An option switch 29 such as a fog lamp switch, a rotary light switch, and the like, may be disposed in the cab 20 on the right side of the operation device 30.

The driver's seat 21 is provided in the cab 15 at a center of the cab 20 in the vehicle width direction. The driver's seat 21 is disposed such that an operator sitting on the driver's seat 21 can see a side in front of the dump truck 1 (see FIG. 1).

The steering wheel 22 is provided at a center of the cab 20 in the vehicle width direction. The steering wheel 22 is disposed at a side in front of the driver's seat 21 of the vehicle and obliquely above when seen from the seat surface of the driver's seat 21.

The accelerator pedal 23 is disposed at a side in front of the driver's seat 21 of the vehicle and on the right side of the lower portion.

The brake pedal 24 is disposed at a side in front of the driver's seat 21 of the vehicle and on the left side of the accelerator pedal 23, which is the right side of the lower portion.

The back monitor 25 is a display section configured to display an aspect behind the dump truck 1, i.e., an aspect behind the load-carrying platform 6 (see FIG. 1) of the vehicle. For example, the back monitor 25 is disposed on the right side of the steering wheel 22.

<Operation Device>

The operation device 30 is disposed in the vicinity of a side below the back monitor 25, which is on the right side of the steering wheel 22. The operation device 30 includes a device main body 31, a shift lever 32 (a gearshift instruction part), a hoist switch 33 (an elevating/lowering instruction part), a parking brake switch 34, a hoist switch lock knob 35 and a guard section 36.

<Device Main Body>

Figure 3:
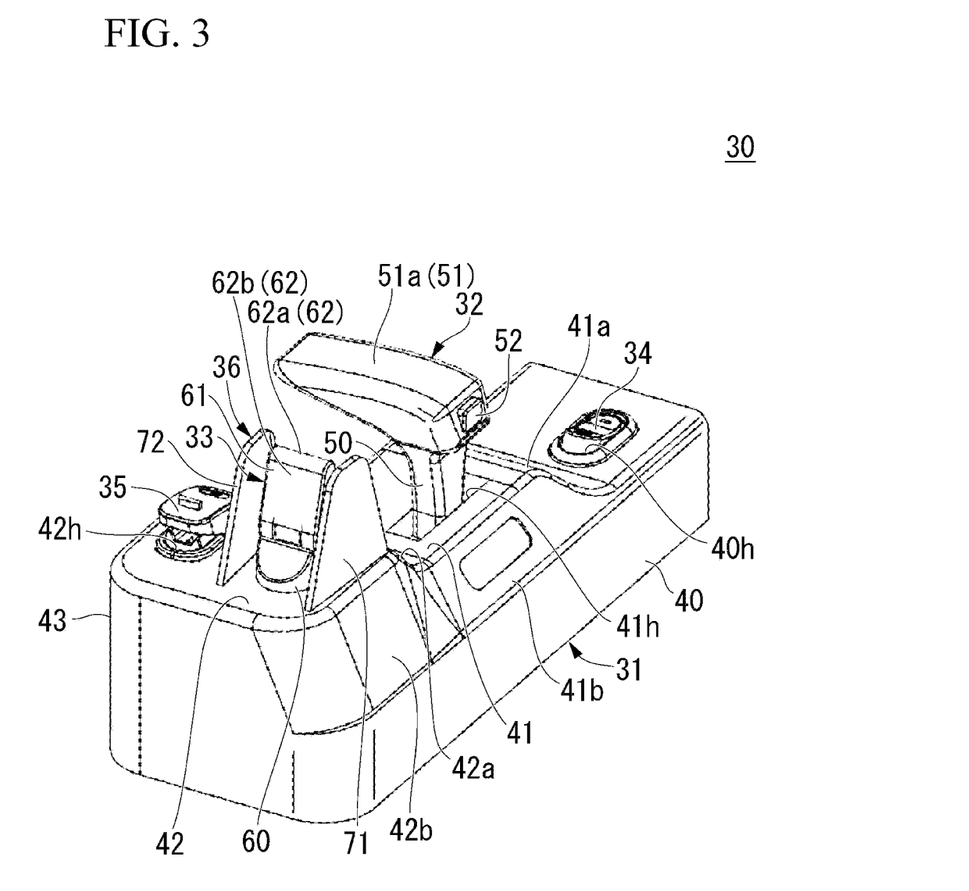
FIG. 3 is a perspective view of an operation device of the work vehicle according to the embodiment.

The device main body 31 is a part that forms an appearance of the operation device 30. As shown in FIG. 3, the device main body 31 includes a base section 40, a first step portion 41 and a second step portion 42. The above-mentioned lever and the like (the shift lever 32, the hoist switch 33, the parking brake switch 34 and the hoist switch lock knob 35) are disposed in the device main body 31.

Figure 4:
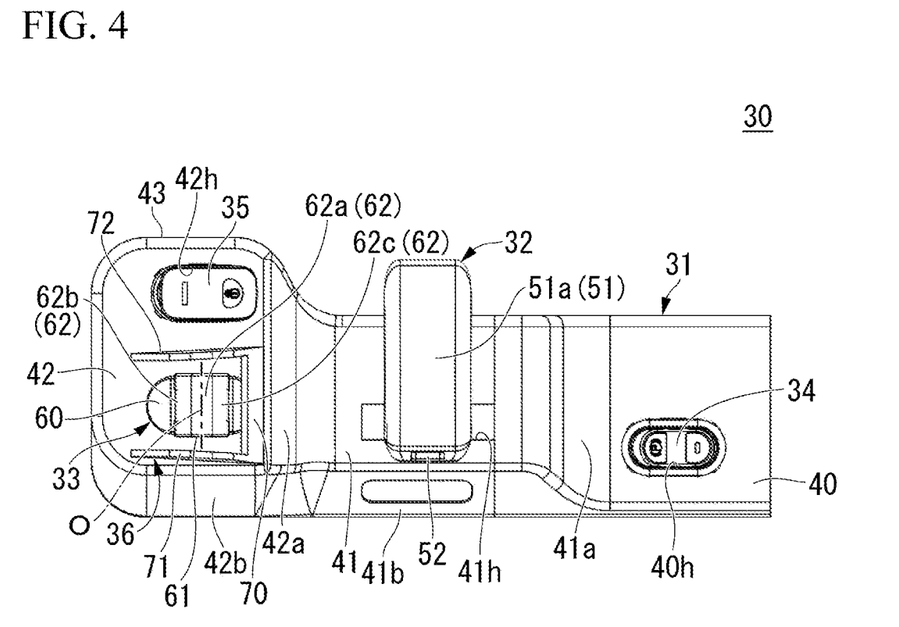
FIG. 4 is a plan view of the operation device according to the embodiment.

As shown in FIG. 4, the base section 40 has a rectangular shape in which a longitudinal direction is the vehicle forward/rearward direction and a short side direction is the vehicle width direction. Hereinafter, the longitudinal direction of the base section 40 is referred to as "the forward/rearward direction of the base section 40" or simply as "the forward/rearward direction." In addition, the short direction of the base section 40 is referred to as "the widthwise direction of the base section 40" or simply as "the widthwise direction." The base section 40 includes an overhanging section 43 overhanging rightward from the front portion of the base section 40 in the widthwise direction. The base section 40 has a hole section 40h that opens in an upper surface of the rear portion of the base section 40 and accommodates a part of the parking brake switch 34.

Figure 5:
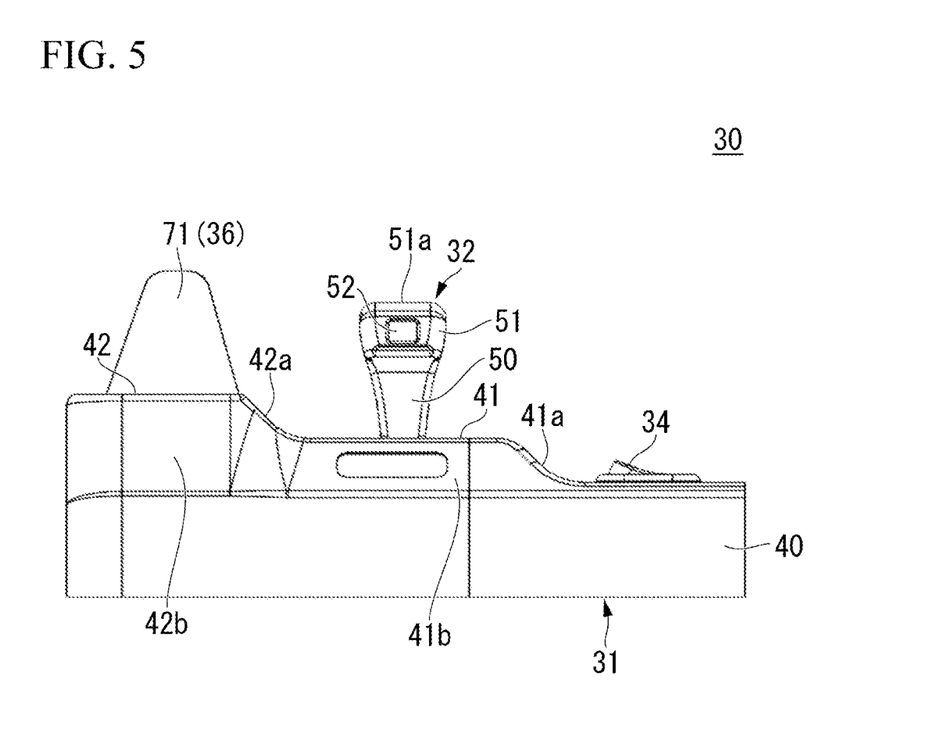
FIG. 5 is a left side view of the operation device according to the embodiment.

As shown in FIG. 5, the first step portion 41 is provided on the upper portion of the base section 40. The first step portion 41 extends over a central portion and a front portion of the base section 40 in the forward/rearward direction. A rear portion of the first step portion 41 is continuous with an upper surface of the rear portion of the base section 40 to form a surface. The base section 40 has a first rear inclined surface 41a inclined from a rear portion of the first step portion 41 toward the upper surface of the rear portion of the base section 40. The first rear inclined surface 41a is inclined to be disposed downward as it goes rearward when seen in a side view from a left side in the widthwise direction (hereinafter, when seen in a side view). A left side portion of the first step portion 41 has a first side inclined surface 41b inclined to be continuous with a left side surface of the base section 40. The first side inclined surface 41b is inclined to be disposed downward as it goes leftward when seen in a rear view (see FIG. 7). The first step portion 41 has a shifting groove section 41h (see FIG. 4) that opens in the upper surface of the first step portion 41 and accommodates a part of the shift lever 32.

As shown in FIG. 5, the second step portion 42 is provided on an upper portion and a front portion of the first step portion 41. A rear portion of the second step portion 42 is continuous with an upper surface of the first step portion 41 to form a surface. The base section 40 has a second rear inclined surface 42a inclined from a rear portion of the second step portion 42 toward the upper surface of the first step portion 41. The second rear inclined surface 42a is inclined to be disposed downward as it goes rearward when seen in a side view. A left side portion of the second step portion 42 has a second side inclined surface 42b inclined to be continuous with the left side portion of the base section 40. The second side inclined surface 42b is inclined to be steeper than the first side inclined surface 41b to be disposed downward as it goes leftward when seen in a rear view (see FIG. 7). The second step portion 42 has a groove section 42h for a knob (see FIG. 4) that opens in the upper surface of the second step portion 42 and accommodates a part of the hoist switch lock knob 35.

<Shift Lever>

The shift lever 32 can change a speed of the dump truck 1 (see FIG. 1) by being operated in the forward/rearward direction. The shift lever 32 can switch a gear of a transmission (not shown) to a predetermined variable speed level by being operated in the forward/rearward direction. The shift lever 32 is operated when it is switched between advance and retreat of the dump truck 1 (see FIG. 1). The shift lever 32 is operated by a right hand of an operator who is sitting on the driver's seat 21 (see FIG. 2).

Figure 7:
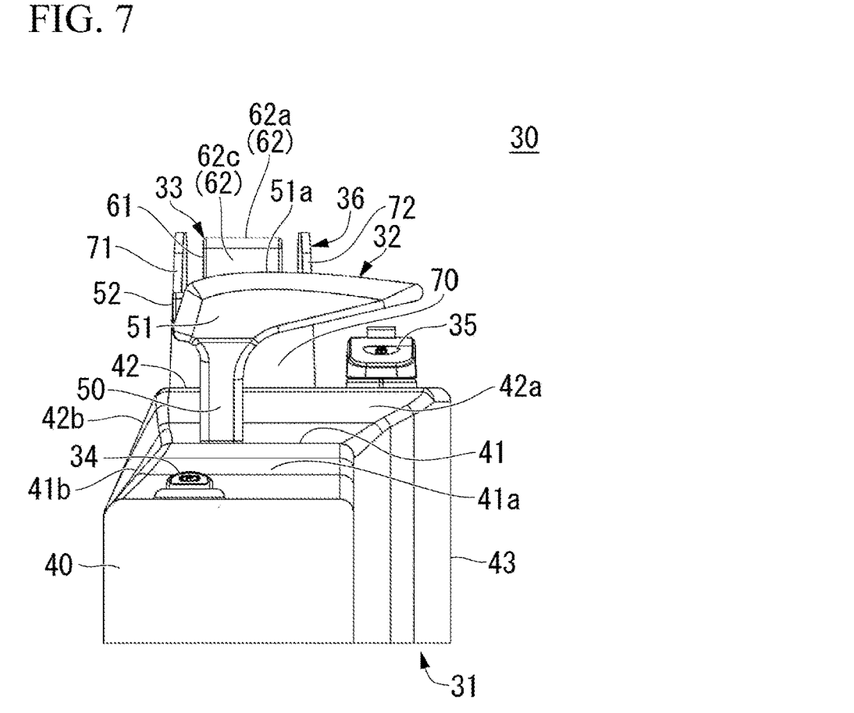
FIG. 7 is a rear view of the operation device according to the embodiment.

As shown in FIG. 7, the shift lever 32 extends upward via the shifting groove section 41h (see FIG. 4) formed in the first step portion 41, and has an L shape when seen in a front view or when seen in a rear view. The shift lever 32 is movable in the forward/rearward direction along a horizontal plane using a formation range of the shifting groove section 41h as a moving range (see FIG. 8).

Figure 8:
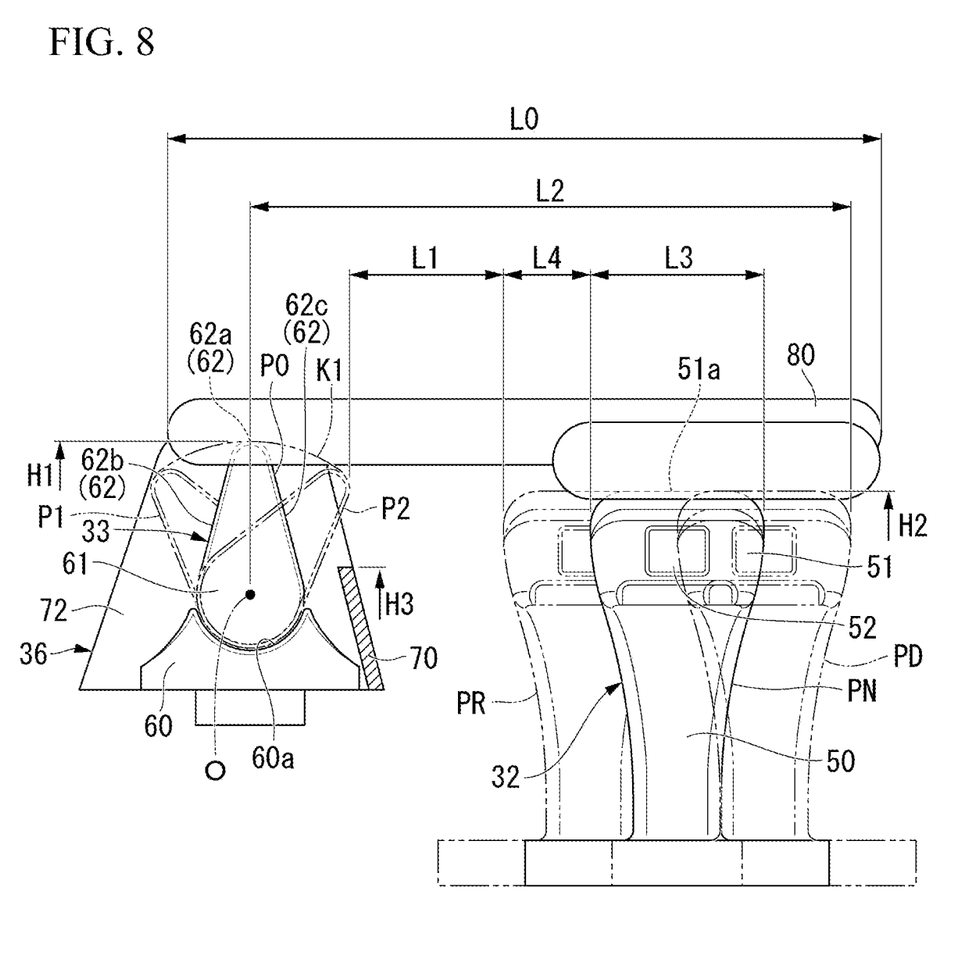
FIG. 8 is a view for describing shift lever and hoist switch operations and disposition intervals of the operation device according to the embodiment.

The dump truck 1 is in a state in which the dump truck 1 is able to advance when the shift lever 32 is at a rearward position PD of the shifting groove section 41h in the forward/rearward direction (see FIG. 8).

The dump truck 1 is in a state in which the dump truck 1 is able to retreat when the shift lever 32 is at a forward position PR of the shifting groove section 41h in the forward/rearward direction (see FIG. 8).

The dump truck 1 is in a state in which the dump truck 1 is unable to advance and retreat (a neutral state) when the shift lever 32 is at a central position PN of the shifting groove section 41h in the forward/rearward direction (see FIG. 8).

Hereinafter, the central position PN, the forward position PR and the rearward position PD in the moving range of the shift lever 32 may be referred to as a neutral position, a reverse position and a drive position. The shift lever 32 is movable between the reverse position moved forward from the neutral position and the drive position moved rearward from the neutral position.

As shown in FIG. 3, the shift lever 32 includes an arm section 50, a grip section 51 and a side switch 52.

The arm section 50 extends in the upward/downward direction via the shifting groove section 41h formed in the first step portion 41. The arm section 50 is connected to the device main body 31 to be movable in the forward/rearward direction.

The grip section 51 extends rightward from an upper end of the arm section 50 in the widthwise direction. An outer circumferential surface of the grip section 51 is referred to as a grip surface held by a right hand of an operator who is sitting on the driver's seat 21. A lower portion of the grip section 51 is inclined to be disposed upward as it goes rightward when seen in a rear view (see FIG. 7).

The grip section 51 has an installation surface section 51a with an area of the upper surface of the grip section 51 on which the operator's palm can be placed. The installation surface section 51a is a smooth surface with no irregularities. When seen in a rear view, the installation surface section 51a is curved to be convex upward (see FIG. 7). When seen in a side view, the installation surface section 51a is a plane parallel to the horizontal plane in the forward/rearward direction (see FIG. 5).

The side switch 52 is a switch that makes it possible to move the arm section 50 in the forward/rearward direction by being pressed. The side switch 52 is provided on a left side end portion of the grip section 51. The side switch 52 is operated by a thumb of a right hand of an operator who is sitting on the driver's seat 21.

When the operator operates the shift lever 32, the operator puts the palm of the right hand on the installation surface section 51a in the grip section 51 of the shift lever 32 and grips the grip section 51 using a middle finger, a ring finger and a little finger of the right hand. Here, a thumb of the right hand will press the side switch 52 in the left side end portion of the grip section 51. For example, a forefinger of the right hand is displaced in a folded state in front of the arm section 50.

<Hoist Switch>

The hoist switch 33 is a switch configured to operate elevation of the load-carrying platform 6 of the vehicle rear portion 2. The hoist switch 33 is disposed in front of the shift lever 32. When seen in a front view, when looking at a positional relation in the leftward/rightward direction, a position of the hoist switch 33 is disposed at a position overlapping the position of the left side portion of the grip section 51 of the shift lever 32 (see FIG. 6). The hoist switch 33 is operated by a finger of a right hand of an operator who is sitting on the driver's seat 21. For example, the hoist switch 33 can be operated by a fore finger or a middle finger.

The hoist switch 33 includes a switch main body 60 and a switch knob 61.

The switch main body 60 is provided on an upper surface of the second step portion 42 of the device main body 31. The switch main body 60 has an accommodating concave section 60a (see FIG. 8) configured to accommodate a part of the switch knob 61 such that the switch knob 61 can be tilted. As shown in FIG. 8, the accommodating concave section 60a has an arc shape that is concave downward when seen in a side view.

The switch knob 61 is connected to the switch main body 60 to be pivotable around a rotation axis O extending in the widthwise direction using the rotation axis O as a support point. The rotation axis O of the switch knob 61 is parallel to the widthwise direction and perpendicular to the forward/rearward direction.

The switch knob 61 stands upward from the switch main body 60 at a neutral position P0. A thickness of the switch knob 61 in the forward/rearward direction gradually reduces toward a side opposite to the switch main body 60 when seen in a side view. Surfaces other than the surface of the switch knob 61 opposite to the accommodating concave section 60a of the switch main body 60 (surfaces on an upper side, a front side and a rear side) are operation surfaces 62. The operation surfaces 62 are operated by a finger (for example, a fore finger or a middle finger) of a right hand of an operator who is sitting on the driver's seat 21.

The operation surfaces 62 are constituted by an apex 62a, a front operation surface 62b and a rear operation surface 62c.

Figure 6:
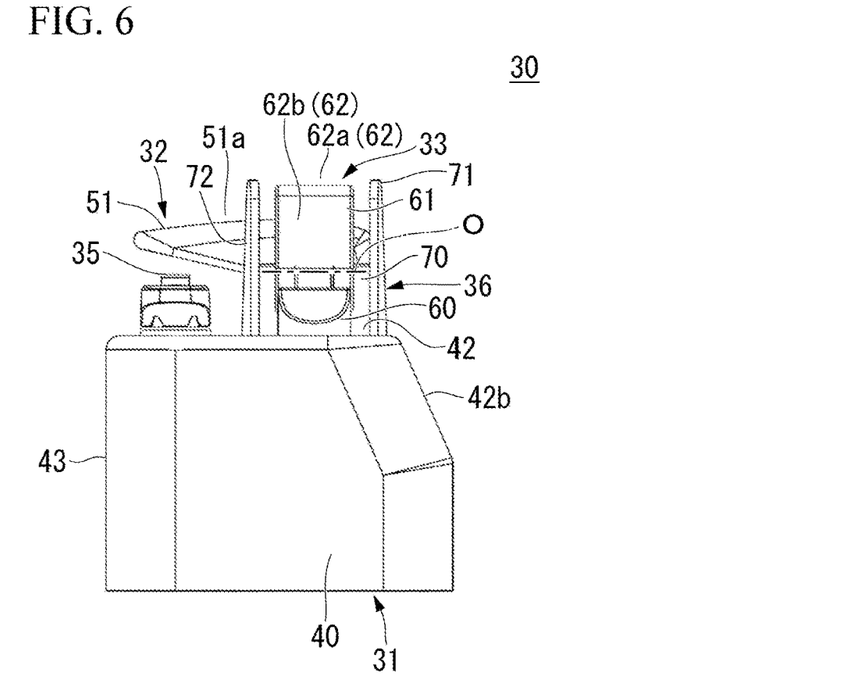
FIG. 6 is a front view of the operation device according to the embodiment.

The apex 62a is an end portion (a protrusion end portion) of the switch knob 61 opposite to the switch main body 60. The apex 62a is a portion that connects the front operation surface 62b and the rear operation surface 62c in the forward/rearward direction. As shown in FIG. 6, the apex 62a extends linearly parallel to the rotation axis O. That is, the apex 62a extends uniformly in the widthwise direction. The apex 62a is a portion of the operation surface 62 farthest from the rotation axis O. That is, the apex 62a is present on a circumference about the rotation axis O. The circumference corresponds to a tilting trajectory K1, which will be described below.

As shown in FIG. 8, the front operation surface 62b is a surface of the switch knob 61 exposed forward from the accommodating concave section 60a. The front operation surface 62b is a surface, a widthwise direction of which is a short direction, while a direction in which the switch knob 61 protrudes is a longitudinal direction.

The rear operation surface 62c is a surface of the switch knob 61 exposed rearward from the accommodating concave section 60a. The rear operation surface 62c is a surface, a widthwise direction of which is a short direction, while a direction in which the switch knob 61 protrudes is a longitudinal direction. An interval between the front operation surface 62b and the rear operation surface 62c in the forward/rearward direction gradually decreases toward the apex 62a when seen in a side view.

The switch knob 61 is pivotable around the rotation axis O between the neutral position P0, a forward inclined position P1 and a rearward inclined position P2.

The neutral position P0 is a position at which the switch knob 61 is tilted neither forward nor rearward. When the switch knob 61 is at the neutral position P0, it is referred to as a state in which the load-carrying platform 6 is unable to be raised and lowered (a holding state of the load-carrying platform 6 or a state in which the load-carrying platform 6 can be raised or lowered by an external force without being restrained, hereinafter, referred to as "a neutral state").

The forward inclined position P1 is a position at which the switch knob 61 is tilted forward from the neutral position P0. When the switch knob 61 is at the forward inclined position P1, the load-carrying platform 6 is in a state in which it can be lowered.

The rearward inclined position P2 is a position at which the switch knob 61 is tilted rearward from the neutral position P0. When the switch knob 61 is at the rearward inclined position P2, the load-carrying platform 6 is in a state in which it can be raised.

Irrespective of whether the switch knob 61 is at the neutral position P0, the forward inclined position P1 or the rearward inclined position P2, the operation surfaces 62 are exposed on sides (an upper side, a front side and a rear side) opposite to the switch main body 60 from the accommodating concave section 60a.

A height 111 of the apex of the hoist switch 33 at the neutral position P0 is higher than a height 112 of the upper surface of the shift lever 32 (H1>H2). Here, the height 111 of the apex of the hoist switch 33 at the neutral position P0 means an upper end position of the apex 62a of the switch knob 61 in the hoist switch 33 at the neutral position P0. The height 112 of the upper surface of the shift lever 32 means an upper end position of the installation surface section 51a of the grip section 51 in the shift lever 32.

A position of the rotation axis O of the hoist switch 33 remains in place regardless of the position of the shift lever 32 in the forward/rearward direction. The hoist switch 33 does not move integrally with the shift lever 32 according to movement of the shift lever 32 in the forward/rearward direction. Since the switch knob 61 of the hoist switch 33 is in place, when the shift lever 32 moves in the forward/rearward direction, an interval between the shift lever 32 and the hoist switch 33 in the forward/rearward direction is varied. That is, a relative position between the shift lever 32 and the hoist switch 33 in the forward/rearward direction varies according to movement of the shift lever 32 in the forward/rearward direction.

<Parking Brake Switch>

The parking brake switch 34 is a switch configured to stop the dump truck 1. As shown in FIG. 4, the parking brake switch 34 is disposed behind the shift lever 32. The parking brake switch 34 is a so-called seesaw switch that is tiltable with respect to the device main body 31 forward or rearward around an axis (not shown) extending in the widthwise direction. The parking brake switch 34 is operated by a right hand of an operator who is sitting on the driver's seat 21.

<Hoist Switch Lock Knob>

The hoist switch lock knob 35 is a switch configured to disable (lock) the hoist switch 33. The hoist switch lock knob 35 is disposed on the right side of the hoist switch 33. The hoist switch lock knob 35 is a so-called seesaw switch that is tiltable with respect to the device main body 31 forward or rearward about an axis (not shown) extending in the widthwise direction. The hoist switch lock knob 35 is operated by a right hand of an operator who is sitting on the driver's seat 21.

<Guard Section>

The guard section 36 is a wall section configured to prevent the operator's hand or finger from inadvertently touching the hoist switch 33 when the operator operates a lever or the like other than the hoist switch 33 (for example, operates only the shift lever 32) or when the hand or finger moves in the vicinity of the hoist switch 33 in a state in which the operator is not willing to operate the hoist switch 33. As shown in FIG. 5, the guard section 36 is provided on the upper surface of the second step portion 42 of the device main body 31. For example, the guard section 36 is formed integrally with the same member as the device main body 31. As shown in FIG. 4, the guard section 36 includes a rear wall section 70 (a partitioning part) and sidewall sections 71 and 72 (side partitioning parts). That is, when seen in a plan view, the guard section 36 is formed in a U shape that opens forward. Further, the guard section 36 may further include a front wall section and have a rectangular shape when seen in a plan view. The guard section 36 is disposed outside of a range of the tilting trajectory K1 of the hoist switch 33 (see FIG. 8). That is, the tilting trajectory K1 of the hoist switch 33 is further inward than the edge of the guard section 36.

<Rear Wall Section>

The rear wall section 70 is a portion of the guard section 36 that partitions a space between the shift lever 32 and the hoist switch 33 in the forward/rearward direction. The rear wall section 70 is disposed behind the hoist switch 33. The rear wall section 70 is disposed at a position that overlaps the hoist switch 33 and the shift lever 32 in the leftward/ rightward direction and the upward/downward direction when seen in a front view (see FIG. 6).

The rear wall section 70 has a rectangular shape, in which a direction in which the switch knob 61 protrudes is a short direction, and a widthwise direction is a longitudinal direction. A length of the rear wall section 70 in the widthwise direction is greater than a length of the switch knob 61 in the widthwise direction. When seen in a cross-sectional view perpendicular to the rotation axis O, the rear wall section 70 has a linear shape inclined to be disposed forward as it goes upward (see FIG. 8). An upper end of the rear wall section 70 is disposed above the rotation axis O. When seen in a plan view, the upper end of the rear wall section 70 is parallel to the widthwise direction and has a linear shape (see FIG. 4).

A height H3 of the rear wall section 70 is lower than the height H2 of the upper surface of the shift lever 32. Here, the height of the rear wall section 70 means an upper end position of the rear wall section 70.

The rear wall section 70 is disposed outside the range of the tilting trajectory K1 of the hoist switch 33. The upper end of the rear wall section 70 is disposed at an interval with the rear operation surface 62c of the switch knob 61 at the rearward inclined position P2.

<Sidewall Section>

The sidewall sections 71 and 72 are portions of the guard section 36 located on left and right sides of the hoist switch 33 in the widthwise direction. As shown in FIG. 4, the sidewall sections 71 and 72 are constituted by a left sidewall section 71 and a right sidewall section 72. The left sidewall section 71 is a portion disposed on the left side of the hoist switch 33. The right sidewall section 72 is a portion disposed on the right side of the hoist switch 33.

The left side sidewall section 71 is disposed at an interval with the left side surface of the hoist switch 33. When seen in a side view, the left sidewall section 71 is disposed to cover the switch knob 61 (see FIG. 8) at the neutral position P0 (see FIG. 5). As shown in FIG. 5, the left sidewall section 71 has a trapezoidal shape in which a length in the forward/rearward direction is decreased as it goes upward to cover the entire switch knob 61 (see FIG. 8) at the neutral position P0 and the forward inclined position P1. When seen in a side view, the left sidewall section 71 has a trapezoidal shape having an upper base extending linearly in the forward/rearward direction at a position above the apex 62a of the switch knob 61 at the neutral position P0 and a lower base extending linearly along the upper surface of the second step portion 42 of the device main body 31 and in the forward/rearward direction. When seen in a side view, the right sidewall section 72 has a trapezoidal shape that overlaps an appearance of the left sidewall section 71. A left end portion of the rear wall section 70 in the widthwise direction is coupled to a rear lower portion of the left sidewall section 71. A right end portion of the rear wall section 70 in the widthwise direction is coupled to a rear lower portion of the right sidewall section 72. Further, when the switch knob 61 is at the forward inclined position P1, the switch knob 61 may be disposed to be visible outside the trapezoidal shape of the left sidewall section 71 or the right sidewall section 72 when seen in a side view. The guard section 36 may not have to prevent even a wrong operation such as an operation of the switch knob 61 to the forward inclined position P1.

<Disposition of Shift Lever and Hoist Switch>

As shown in FIG. 8, a space is provided between the shift lever 32 at the forward position PR and the hoist switch 33 at the rearward inclined position P2 in the forward/rearward direction. For example, an interval L1 between the shift lever 32 at the forward position PR and the hoist switch 33 at the rearward inclined position P2 in the forward/rearward direction is preferably at least several tens mm or more. Here, the interval L1 means an interval (a shortest distance) between a front end of the grip section 51 of the shift lever 32 at the forward position PR and a rear end of the apex 62a of the hoist switch 33 at the rearward inclined position P2 in the forward/rearward direction.

For example, the interval L1 preferably has a size such that a fore finger of a right hand folded not to touch the hoist switch 33 at the rearward inclined position P2 can be disposed behind the rear wall section 70 when the fore finger is folded forward and downward in a state in which the operator places the palm of the right hand on the installation surface section 51a of the shift lever 32 at the forward position PR.

An interval L2 between the shift lever 32 at the rearward position PD and the hoist switch 33 at the neutral position P0 in the forward/rearward direction is preferably greater than at least the interval L1 and equal to or less than several tens mm. Here, the interval L2 means an interval (shortest distance) between a rear end of the grip section 51 of the shift lever 32 at the rearward position PD and an upper end of the apex 62a of the hoist switch 33 at the neutral position P0 in the forward/rearward direction.

For example, the interval L2 is preferably a size at which the fore finger of the right hand can extend forward and put the belly of the fore finger on the apex 62a of the hoist switch 33 at the neutral position P0 in a state in which the operator places the palm of the right hand on the installation surface section 51a of the shift lever 32 at the rearward position PD. Reference sign 80 in the drawings designates an outline that imitates the right hand of a Japanese woman (for example, a small woman). Reference sign L0 in the drawings designates a length of the right hand 80 of the Japanese woman in the forward/rearward direction.

Further, a length L3 of the shift lever 32 in the forward/rearward direction is set to be greater than a movement pitch L4 of the shift lever 32 in the forward/rearward direction (in the example shown, an interval between a front end of the shift lever 32 at the central position PN and a front end of the shift lever 32 at the forward position PR in the forward/rearward direction).

<Effects>

A load such as earth or the like can be loaded on the load-carrying platform 6 of the dump truck 1. The operator of the dump truck 1 moves the dump truck 1 to a predetermined place, and performs a work of dumping a load on the load-carrying platform 6 (a dump work). For example, when the operator operates the dump truck 1 to perform a dump work, movement of the operator's hand is a procedure from the following (1) to (3).

(1) Moving the dump truck to a dump place while holding the hand with the hand and operating the steering wheel.

(2) Operating the shift lever when the dump truck stops at the dump place.

(3) Operating the hoist lever to hoist-operate the load-carrying platform after the dump truck stops.

When disposition places of the steering wheel, the shift lever and the hoist lever are separated from each other, the following problems may occur. It is assumed that the shift lever is disposed on the right side of the steering wheel, and the hoist lever is disposed behind the shift lever.

In this case, movement of the right hand when the dump work is performed is moved in sequence of the steering wheel, the shift lever disposed on the right side of the steering wheel, and the hoist lever disposed separately behind the shift lever. For this reason, when each of the interval between the steering wheel and the shift lever in the leftward/rightward direction and the interval between the shift lever and the hoist lever in the forward/rearward direction is great, the operator should move the right hand significantly for each operation. The burden on the right hand will increase when such an operation is repeated, which will contribute to the tiredness of the operator. In addition, the operator may move the right hand greatly during each operation and may also move the light of sight, which may make the operator feel annoying.

On the other hand, in the embodiment, the hoist switch 33 is disposed near the front of the shift lever 32.

Accordingly, the operator can operate the hoist switch 33 without greatly moving the right hand when the right hand is moved from the shift lever 32 toward the hoist switch 33. That is, in the embodiment, since the interval between the shift lever 32 and the hoist switch 33 in the forward/rearward direction is small, the operator can easily operate the hoist switch 33 after the operation of the shift lever 32. Accordingly, tired feeling due to the burden of the right hand of the operator can be reduced.

Further, in the embodiment, the hoist switch 33 that is a switch type, which is not a hoist lever that is a lever type, is employed as the elevating/lowering instruction part. For this reason, the hoist switch 33 can be easily operated with the finger of the right hand.

In this way, in the embodiment, operability of the hoist switch 33 can be improved.

Incidentally, depending on the side where the dump truck 1 operates, the operator may need to move his/her hand in various directions. For example, the operator may operate only the shift lever 32 without operating the hoist switch 33. In this case, when there is a space that brings the side of the shift lever 32 in communication with the side of the hoist switch 33, the hand or finger may inadvertently touch the hoist switch 33, which causes the load-carrying platform 6 to malfunction.

On the other hand, in the embodiment, the rear wall section 70 configured to partition the space between the shift lever 32 and the hoist switch 33 in the forward/rearward direction is provided.

For this reason, when the operator operates a lever or the like other than the hoist switch 33 (operates only the shift lever 32), it is possible to prevent the right hand from touching the hoist switch 33 from behind. For example, even when the operator inadvertently moves the right hand during operation of the shift lever 32, since the right hand is blocked by the rear wall section 70 behind the hoist switch 33, it is possible to prevent the right hand from inadvertently touching the hoist switch 33. Accordingly, a wrong operation of the hoist switch 33 can be minimized.

In the embodiment, the height H1 of the apex 62a of the hoist switch 33 at the neutral position P0 is higher than the height H2 of the upper surface of the shift lever 32 (H1>H2).

For this reason, in comparison with the case in which the height H1 of the apex 62a of the hoist switch 33 at the neutral position P0 is equal to or less than the height H2 of the upper surface of the shift lever 32, the wrong operation of the hoist switch 33 can be minimized.

For example, in the case of the embodiment, when the apex 62a of the hoist switch 33 at the neutral position P0 is operated in a state in which the operator places the right hand on the upper surface of the shift lever 32, the operator needs to consciously raise his/her finger upwards. For this reason, it is possible to prevent the finger from inadvertently touching the hoist switch 33.

In the embodiment, the upper surface of the shift lever 32 has the installation surface section 51a (a plane).

For this reason, it is possible to reduce tired feeling caused due to the operation of the shift lever 32 for a long time. That is, the shift lever 32 can also function as a palm rest. For example, the operator can operate the hoist switch 33 while placing the right hand on the shift lever 32. Here, when the shift lever 32 functions as a palm rest, since the chances of the wrong operation of the hoist switch 33 increases, the configuration of the embodiment, which minimizes the wrong operation of the hoist switch 33, has great practical benefits.

In the embodiment, the shift lever 32 is movable along the horizontal plane in the forward/rearward direction.

For this reason, in comparison with the case in which the shift lever 32 is pivotable (movable in an arc shape) around a rotation axis (not shown) extending in the widthwise direction (a direction perpendicular to the forward/rearward direction), it is easy to secure operability of the hoist switch 33 in front of the shift lever 32.

In the case of the embodiment, the hoist switch 33 does not move integrally with the shift lever 32 according to movement of the shift lever 32 in the forward/rearward direction. That is, a relative position between the shift lever 32 and the hoist switch 33 in the forward/rearward direction is varied according to movement of the shift lever 32 in the forward/rearward direction. Here, when the relative position between the shift lever 32 and the hoist switch 33 in the forward/rearward direction is varied, since the chances of the wrong operation of the hoist switch 33 increases, the configuration of the embodiment, which minimizes the wrong operation of the hoist switch 33, has great practical benefits.

In the embodiment, the operation device 30 includes the sidewall sections 71 and 72 disposed beside the hoist switch 33 in the widthwise direction.

For this reason, when the operator operates a lever or the like other than the hoist switch 33, it is possible to prevent the right hand from touching the hoist switch 33 from beside in the widthwise direction. Accordingly, it is possible to minimize the wrong operation of the hoist switch 33.

In the case of the embodiment, the sidewall sections 71 and 72 are constituted by the left sidewall section 71 located on the left side of the hoist switch 33 and the right sidewall section 72 located on the right side of the hoist switch 33. For this reason, when the operator operates a lever or the like other than the hoist switch 33, it is possible to prevent the right hand from touching the hoist switch 33 from both sides in the widthwise direction.

For example, even when the operator moves the right hand inadvertently rightward after operation of the steering wheel 22, since the right hand is blocked by the left sidewall section 71 on the left side of the hoist switch 33, it is possible to prevent the right hand from touching the hoist switch 33 inadvertently.

In the case of the embodiment, a height of the sidewall sections 71 and 72 is greater than the height of the apex 62a of the hoist switch 33 at the neutral position P0. For this reason, it is possible to minimize the wrong operation of the hoist switch 33 from above.

In the embodiment, when seen in the widthwise direction, the sidewall sections 71 and 72 are disposed to cover the hoist switch 33 at the neutral position P0.

For this reason, it is possible to more effectively prevent the right hand from touching the hoist switch 33 at the neutral position P0 from besides in the widthwise direction.

In the embodiment, the hoist switch 33 is pivotable around the rotation axis O extending in the widthwise direction between the forward inclined position P1 tilted forward from the neutral position P0 and the rearward inclined position P2 tilted rearward from the neutral position P0.

According to the configuration, in comparison with the case in which the hoist switch 33 is pivotable around the rotation axis extending in the forward/rearward direction, it is easy to secure operability of the hoist switch 33 in front of the shift lever 32.

In the embodiment, the upper end of the rear wall section 70 is located above the rotation axis O of the hoist switch 33.

According to the configuration, it is possible to cover at least a part of a portion (the rear operation surface 62c) of the hoist switch 33 that contributes to the operation of the hoist switch 33 by the rear wall section 70 from behind. Accordingly, it is possible to more effectively minimize the wrong operation of the hoist switch 33.

In the embodiment, the rear wall section 70 is disposed outside the range of the tilting trajectory K1 of the hoist switch 33.

According to the configuration, when the hoist switch 33 is tilted, the hoist switch 33 does not touch the rear wall section 70. That is, the rear wall section 70 does not interfere with the operation of the hoist switch 33. Accordingly, operability of the hoist switch 33 can be secured.

In the embodiment, the interval L1 between the shift lever 32 at the forward position PR and the hoist switch 33 at the rearward inclined position P2 in the forward/rearward direction is equal to or greater than at least tens mm. In this case, in comparison with the case in which the interval L1 is short, it is easy to minimize the wrong operation of the hoist switch 33.

Further, the interval L2 between the shift lever 32 at the rearward position PD and the hoist switch 33 at the neutral position P0 in the forward/rearward direction is greater than at least the interval L1 and equal to or less than tens mm. In this case, it is easy to operate the hoist switch 33 even for a small woman by setting the interval L2 in consideration of the length of the palm. In addition, the operator can operate the hoist switch 33 with the fore finger of the right hand while placing the palm of the right hand on the shift lever 32 at the neutral position P0 and a drive position PD at which a frequency of use is higher than at a reverse position PR of the shift lever 32.

In the embodiment, the height H3 of the rear wall section 70 is less than the height H2 of the upper surface of the shift lever 32.

According to the configuration, in comparison with the case in which the height H3 of the rear wall section 70 is equal to or greater than the height H2 of the upper surface of the shift lever 32, it is easy to secure operability of the hoist switch 33 in front of the shift lever 32.

In the embodiment, the rear wall section 70 is disposed at a position overlapping the hoist switch 33 and the shift lever 32 in the leftward/rightward direction and the upward/downward direction when seen in the forward/rearward direction.

For this reason, when the shift lever 32 is moved from the central position PN to the forward position PR, it is possible to more effectively prevent the right hand from touching the hoist switch 33 from behind.

In the embodiment, the hoist switch 33 is disposed at a position overlapping the shift lever 32 in the leftward/rightward direction and the upward/downward direction when seen in the forward/rearward direction. For this reason, it is easy to operate the hoist switch 33 in front of the shift lever 32 after the operation of the shift lever 32. Accordingly, it is possible to minimize the wrong operation of the hoist switch 33 while securing the operability of the hoist switch 33.

In the embodiment, the operation device 30 is disposed near the bottom of the back monitor 25 located on the right side of the steering wheel 22.

For this reason, the operator can see the back monitor 25 by moving his/her gaze slightly while looking at the right hand. For example, it is possible to easily see the situation behind the vehicle projected on the back monitor 25 while operating the operation device 30 in the case in which the situation behind the dump truck 1 is desired to be recognized when the operator hoist-operates the load-carrying platform 6.

Other Embodiments

While the example in which the operation device 30 is disposed on the right side of the steering wheel 22, in which the left side of the steering wheel 22 is set as one side in the vehicle width direction (one side in the leftward/rightward direction) and the right side of the steering wheel 22 is set as the other side in the vehicle width direction (the other side in the leftward/rightward direction) has been exemplarily described in the above-mentioned embodiment, there is no limitation thereto. For example, the operation device 30 may be disposed on the left side of the steering wheel 22.

While the example in which the steering wheel 22 is disposed at a center in the vehicle width direction has been exemplarily described in the above-mentioned embodiment, there is no limitation thereto. For example, the steering wheel 22 may be disposed on the left side of the vehicle, which is one side in the vehicle width direction. In this case, the driver's seat 21 is disposed on the left side of the vehicle.

While the example in which the relative position between the shift lever 32 and the hoist switch 33 in the forward/rearward direction is varied according to movement of the shift lever 32 in the forward/rearward direction has been exemplarily described in the above-mentioned embodiment, there is no limitation thereto. For example, the relative position between the shift lever 32 and the hoist switch 33 in the forward/rearward direction may not be varied according to movement of the shift lever 32 in the forward/rearward direction.

While the example in which the central position PN, the forward position PR and the rearward position PD within the moving range of the shift lever 32 are set as the neutral position, the reverse position and the drive position has been exemplarily described in the above-mentioned embodiment, there is no limitation thereto. For example, the central position PN, the forward position PR and the rearward position PD within the moving range of the shift lever 32 may be set as a neutral position, a drive position and a reverse position. In this case, the shift lever 32 is movable between the reverse position moved rearward from the neutral position and the drive position moved forward from the neutral position. Further, the drive position may be set by switching a plurality of variable speed levels, in addition to the rearward position PD.

While the examples corresponding to the neutral state, the state in which the load-carrying platform 6 can be lowered and the state in which the load-carrying platform 6 can be raised in the cases in which the hoist switch 33 is at the neutral position P0, at the forward inclined position P1 and at the rearward inclined position P2 have been exemplarily described in the above-mentioned embodiment, there is no limitation thereto. For example, the examples may correspond to the neutral state, the state in which the load-carrying platform 6 can be raised and the state in which the load-carrying platform 6 can be lowered in the cases in which the hoist switch 33 is at the neutral position P0, at the forward inclined position P1 and at the rearward inclined position P2. That is, an operation that enables elevation of the load-carrying platform 6 may be the opposite of the embodiment according to a forward inclination operation and a rearward inclination operation of the hoist switch 33.

While the example in which the guard section 36 is formed integrally with the same member as the device main body 31 has been exemplarily described in the above-mentioned embodiment, there is no limitation thereto. For example, the guard section 36 may be formed integrally with a member different from the device main body 31. In this case, a guard member as a guard section manufactured individually from the device main body 31 is attached to the device main body 31.

While the example in which the height H1 of the apex 62a of the hoist switch 33 at the neutral position P0 is greater than the height H2 of the upper surface of the shift lever 32 has been exemplarily described in the above-mentioned embodiment, there is no limitation thereto. For example, the height H1 of the apex 62a of the hoist switch 33 at the neutral position P0 may be equal to or less than the height H2 of the upper surface of the shift lever 32.

While the example in which the upper surface of the shift lever 32 has the installation surface section 51a with an area in which the palm of the operator can be placed has been exemplarily described in the above-mentioned embodiment, there is no limitation thereto. For example, the upper surface of the shift lever 32 may have an area in which the palm of the operator can be placed.

While the example in which the shift lever 32 is movable along the horizontal plane in the forward/rearward direction has been exemplarily described in the above-mentioned embodiment, there is no limitation thereto. For example, the shift lever 32 may be movable in a direction obliquely crossing the horizontal plane. For example, the shift lever 32 may be pivotable (movable in an arc shape) around the rotation axis extending in the widthwise direction (the direction perpendicular to the forward/rearward direction).

While the example in which the operation device 30 includes the sidewall sections 71 and 72 located besides the hoist switch 33 in the widthwise direction has been exemplarily described in the above-mentioned embodiment, there is no limitation thereto. For example, the operation device 30 may not include the sidewall sections 71 and 72. That is, the operation device 30 may include only the rear wall section 70 as the guard section 36.

While the example in which the hoist switch 33 is pivotable around the rotation axis O extending in the widthwise direction between the forward inclined position P1 tilted forward from the neutral position P0 and the rearward inclined position P2 tilted rearward from the neutral position P0 has been exemplarily described in the above-mentioned embodiment, there is no limitation thereto. For example, the hoist switch 33 may be a button type that can be pressed from above. In this case, the upper end of the rear wall section 70 is disposed above an operated surface of the button (for example, an upper surface of the button).

While the example in which the height H3 of the rear wall section 70 is smaller than the height H2 of the upper surface of the shift lever 32 has been exemplarily described in the above-mentioned embodiment, there is no limitation thereto. For example, the height H3 of the rear wall section 70 may be equal to or greater than the height H2 of the upper surface of the shift lever 32.

While the example in which the rear wall section 70 has a rectangular shape, in which a direction in which the switch knob 61 protrudes is a short direction and a widthwise direction is a longitudinal direction has been exemplarily described in the above-mentioned embodiment, there is no limitation thereto. For example, the rear wall section 70 may have a rod shape extending in a direction in which the switch knob 61 protrudes. That is, the rear wall section 70 may function as a partitioning part that partitions a space between the shift lever 32 and the hoist switch 33 in the forward/rearward direction.

While the example in which the present invention is applied to the articulated dump truck 1 as an example of the work vehicle has been exemplarily described in the above-mentioned embodiment, there is no limitation thereto. For example, the present invention may be applied to another work vehicle such as a rigid frame type dump truck or the like.

Hereinabove, while the embodiment of the present invention has been described, the present invention is not limited thereto, additions, omissions, substitutions and other modifications may be made without departing from the spirit of the present invention, and the above-mentioned embodiments may be combined in appropriate.

INDUSTRIAL APPLICABILITY

According to the disclosure of the present invention, it is possible to minimize a wrong operation of an elevating/lowering instruction part.

BRIEF DESCRIPTION OF THE REFERENCE SYMBOLS

1 Dump truck (work vehicle)
6 Load-carrying platform
22 Steering wheel
25 Back monitor
30 Operation device
32 Shift lever (gearshift instruction part)
33 Hoist switch (elevating/lowering instruction part)
51a Installation surface section
70 Rear wall section (partitioning part)
71 Left sidewall section (side partitioning part)
72 Right sidewall section (side partitioning part)
O Rotation axis
PN Central position
PR Forward position
PD Rearward position
P0 Neutral position
P1 Forward inclined position
P2 Rearward inclined position
K1 Tilting trajectory
L1 Interval in forward/rearward direction between shift lever at forward position and hoist switch at rearward inclined position
L2 Interval in forward/rearward direction between shift lever at rearward position and hoist switch at neutral position
H1 Height of apex of hoist switch at central position
H2 Height of upper surface of shift lever
H3 Height of rear wall section

The invention claimed is:

1. An operation device of a work vehicle having a load-carrying platform, the operation device comprising:
a gearshift instruction part configured to change a speed of the work vehicle by being operated in a forward/rearward direction;
an elevating/lowering instruction part disposed in front of the gearshift instruction part and configured to operate elevation of the load-carrying platform; and
a partitioning part configured to partition a space between the gearshift instruction part and the elevating/lowering instruction part in the forward/rearward direction,
wherein the elevating/lowering instruction part is pivotable around a rotation axis extending in a widthwise direction between a forward inclined position tilted forward from a neutral position and a rearward inclined position tilted rearward from the neutral position,
wherein the partitioning part is disposed outside a range of a tilting trajectory of the elevating/lowering instruction part.

2. The operation device according to claim 1, wherein a height of an apex of the elevating/lowering instruction part at a neutral position is greater than a height of an upper surface of the gearshift instruction part.

3. The operation device according to claim 1, wherein the upper surface of the gearshift instruction part is a plane.

4. The operation device according to claim 1, wherein the gearshift instruction part is movable along a horizontal plane in the forward/rearward direction.

5. The operation device according to claim 1, further comprising a side partitioning part located beside the elevating/lowering instruction part in a widthwise direction perpendicular to the forward/rearward direction.

6. The operation device according to claim 5, wherein the side partitioning part is disposed to cover the elevating/lowering instruction part at a neutral position when seen in the widthwise direction.

7. The operation device according to claim 1, wherein an upper end of the partitioning part is located above the rotation axis.

8. The operation device according to claim 1, wherein a height of the partitioning part is less than a height of the upper surface of the gearshift instruction part.

9. The operation device according to claim 1, wherein the partitioning part is disposed at a position overlapping the elevating/lowering instruction part and the gearshift instruction part when seen in the forward/rearward direction.

10. The operation device according to claim 1, wherein the operation device is disposed at one side of a steering wheel in a leftward/rightward direction, which is one side in a vehicle width direction.

11. The operation device according to claim 10, wherein the operation device is disposed near the bottom of a back monitor located at one side of the steering wheel in a leftward/rightward direction.

12. A work vehicle comprising:
a steering wheel; and
the operation device according to claim 1 disposed at one side of the steering wheel in a leftward/rightward direction, which is one side in a vehicle width direction.

* * * * *